United States Patent
Sato et al.

(10) Patent No.: US 7,335,418 B2
(45) Date of Patent: Feb. 26, 2008

(54) SEMICONDUCTOR NANOPARTICLE HAVING HIGH LUMINESCENCE PROPERTIES COMPRISING AN ELECTRON-DONOR GROUP AND A MULTILAYERED COATING COMPRISING A HYDROPHOBIC GROUP

(75) Inventors: Keiichi Sato, Tokyo (JP); Susumu Kuwabata, Osaka (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 156 days.

(21) Appl. No.: 11/269,851

(22) Filed: Nov. 9, 2005

(65) Prior Publication Data

US 2006/0240258 A1  Oct. 26, 2006

(30) Foreign Application Priority Data

Nov. 12, 2004  (JP)  ............................. 2004-329380

(51) Int. Cl.
*B32B 5/16* (2006.01)
*B05D 7/00* (2006.01)

(52) U.S. Cl. .................. 428/403; 427/215; 427/217; 977/773; 977/813; 977/834

(58) Field of Classification Search ................ 428/403; 427/215, 217; 977/773, 813, 834
See application file for complete search history.

(56) References Cited

U.S. PATENT DOCUMENTS

| 6,319,426 | B1 * | 11/2001 | Bawendi et al. | ........ 252/301.4 R |
| 6,649,138 | B2 * | 11/2003 | Adams et al. | ............... 423/403 |
| 6,869,545 | B2 * | 3/2005 | Peng et al. | ........... 252/301.6 S |
| 6,872,450 | B2 * | 3/2005 | Liu et al. | ..................... 428/403 |
| 6,884,478 | B2 * | 4/2005 | Alivisatos et al. | ........... 428/1.1 |
| 6,977,182 | B2 * | 12/2005 | Sato et al. | ....................... 438/5 |
| 7,108,915 | B2 * | 9/2006 | Adams et al. | .............. 428/403 |
| 2005/0136258 | A1 * | 6/2005 | Nie et al. | .................... 428/402 |

FOREIGN PATENT DOCUMENTS

| JP | 2001-523758 | 11/1998 |
| JP | 2002-525394 | 9/1999 |
| JP | 2004-51863 | 7/2002 |

(Continued)

OTHER PUBLICATIONS

Wu, Xiangyong et al. "Immunofluorescent labeling of cancer marker Her2 and other cellular targets with semiconductor quantum dots", Nature Biotechnology vol. 21, Jan. 2003, www.nature.com/naturebiotechnology, pp. 41-46.

(Continued)

*Primary Examiner*—H. T Le
(74) *Attorney, Agent, or Firm*—Reed Smith LLP; Stanley P. Fisher, Esq.; Juan Carlos A. Marquez, Esq.

(57) ABSTRACT

Disclosed is a semiconductor nanoparticle having excellent chemical durability and high luminescence properties. The chemical durability of the particle is provided by coating the semiconductor nanoparticle having high luminescence properties dispersed in an organic solvent using a surface-active agent, an amphipathic molecule, and a lipid composed of a combination of two or more layers selected from a polar group, a hydrophobic group, a hydrophilic group, and a functional group (herein, the hydrophobic group is a necessary element and the hydrophilic group and the functional group are optional).

13 Claims, 9 Drawing Sheets

FOREIGN PATENT DOCUMENTS

| | | |
|---|---|---|
| JP | 2004-243507 | 3/2003 |
| JP | 2004-352594 | 5/2003 |
| JP | 2005-103746 | 12/2003 |
| WO | WO 99/26299 | 5/1999 |
| WO | WO 00/17655 A1 | 9/1999 |

OTHER PUBLICATIONS

Coe, Seth et al. "Electroluminescence from single monolayers of nanocrystals in molecular organic devices", Nature, vol. 420 Dec. 2002, www.nature.com/nature, pp. 800-803.

Dubertret, Benoit et al. "In Vivo Imaging of Quantum Dots Encapsulated in Phospholipid Micelles", Science vol. 298, Nov. 29, 2002, www.sciencemag.org, pp. 1759-1762.

Kang, Eui-Chul et al. "Preparation of Water-soluble PEGylated Semiconductor Nanocrystals", The Chemical Society of Japan, Chemistry Letters vol. 33, No. 7, 2004, pp. 840-841.

Dabbousi, B.O. et al. "(CdSe) ZnS Core-Shell Quantum Dots: Synthesis and Characterization of a Size Series of Highly Luminescent Nanocrystallites", American Chemical Society, J. Phys. Chem. B. vol. 101 No. 46, 1997, pp. 9463-9475.

Youn, Hyeong-Chan, et al. "Dihexadecyl Phosphate, Vesicle-Stabilized and In Situ Generated Mixed CdS and ZnS Semiconductor Particles. Preparation and Utilization for Photosensitized Charge Separation and Hydrogen Generation", American Chemical Society, J. Phys. Chem. vol. 92 No. 22, 1988, pp. 6320-6327.

Spanhel, Lubomir et al. "Photochemistry of Colloidal Semiconductors. 20. Surface Modification and Stability of Strong Luminescing CdS Particles", J. Am, Chem. Soc. vol. 109 No. 19, 1987, pp. 5649-5655.

Tian, Yongchi et al. "Coupled Composite CdS-CdSe and Core-Shell Types of (CdS)CdSe and (CdSe)CdS Nanoparticles", J. Phys. Chem. vol. 100 No. 21, 1996, pp. 8927-8939.

Torimoto, Tsukasa et al. "Characterizationn of Ultrasmall CdS Nanoparticles Prepared by the Size-Selective Photoetching Technique", J. Phys. Chem. B, vol. 105 No. 29, 2001, pp. 6838-6845.

Murray, C.B. et al. "Synthesis and Characterization of Nearly Monodisperse CdE (E=S, Se, Te) Semiconductor Nanocrystallites", J. Am. Chem. Soc. vol. 115 No. 19, 1993, pp. 8706-8715.

Potapova, Inga et al. "Semiconductor Nanocrystals with Multifunctional Polymer Ligands", JACS Communications, J. Am. Chem. Soc. vol. 125 No. 2, , 2003, pp. 320-321.

* cited by examiner

SEMICONDUCTOR NANOPARTICLE HAVING HIGH LUMINESCENCE PROPERTIES COMPRISING AN ELECTRON-DONOR GROUP AND A MULTILAYERED COATING COMPRISING A HYDROPHOBIC GROUP

FIELD OF THE INVENTION

The present invention relates to a semiconductor nanoparticle having high luminescence properties and a synthesis method thereof. Moreover, the present invention relates to a fluorescent reagent and an optical device comprising the semiconductor nanoparticle.

BACKGROUND OF THE ART

A semiconductor nanoparticle with a particle size of 10 nm or less is in the state of a transition region between a bulk semiconductor crystal and a molecule, so that it has physicochemical properties different from both of them. In such a region, orbits are discrete because degeneration of the energy band seen in a bulk semiconductor is released and a quantum size effect appears in which the energy spread of the forbidden band changes depending on the particle size. According to the appearance of the quantum size effect, the energy spread of the forbidden band of the semiconductor nanoparticle decreases or increases depending on increasing or decreasing the particle size. The change of this energy spread of the forbidden band affects the fluorescence properties of the particles. One nanopartical has a smaller particle size and wider energy spread of the forbidden band has a fluorescent wavelength on the shorter wavelength side, and one nanopartical has a larger particle size and a narrower energy spread of the forbidden band has a fluorescent wavelength on the longer wavelength side. That is, it is possible to create a desired fluorescent color by controlling the particle size. The semiconductor nanoparticle also has high durability against an excitation light, etc., a region which can be excited widely spreads on the shorter wavelength than the fluorescent wavelength. Simultaneous excitation of multiple fluorescent colors is also possible by using a single excitation light source, resulting in this receiving attention as a fluorescent material. Specifically, the fields related to biotechnology (Nature Biotech. 21:41 (2003), etc.) and to optical device technology (Nature. 420:800 (2002), etc.) are listed as a field in which it has been used aggressively, and further applications in the future are expected.

In order to use the semiconductor nanoparticle as a fluorescence material, it is desirable that it has fluorescence properties in which the fluorescence spectrum has a waveform with a narrow and sharp full width half maximum. This is necessary in order for it to make use of the band gap fluorescence properties due to the forbidden band spread of the semiconductor nanoparticle. However, even if the particle size of the prepared bulk particles is made as a monodispersion, the band gap fluorescence properties are not sufficiently to manifest as is. As such, the presence of the energy level existing mainly at the surface site of the semiconductor nanoparticle is mentioned. Since the energy level in question exists in the forbidden band inside the particle, it has been thought that the band gap fluorescence properties are inhibited. From the reasons mentioned above, it has become a big subject that the aforementioned energy level is made inactive and that the band gap fluorescence is brought out.

As a method for bringing a solution to this subject, a (CdSe) ZnS nanoparticle which has a so-called core-shell type structure has been put forward. The aforementioned method is one in which the band gap fluorescence properties are made effective by coating the semiconductor nanoparticle (CdSe) with a second semiconductor material (ZnS) which has a larger forbidden band spread compared with the particle in question and eliminating the energy level in the forbidden band of the particle in question, resulting in high luminescence properties being obtained (JP-A No. 523758/2001 and J. Phys. Chem. B. 101:9463 (1997)). Additionally, CdS is coated on the CdSe nanoparticle as described in J. Phys. Chem. 100:8927 (1996) and ZnS is coated on the CdS nanoparticle as described in J. Phys. Chem. 92:6320 (1988). However, in any of these instances, there was a problem that a high temperature reaction was necessary using a highly toxic reagent or that commercially adequate fluorescence properties cannot be obtained.

On the other hand, inventors have been studying a method for making band gap fluorescence by making a monodispersion of the particle size in an aqueous solution and improving the particle surface. As a method for making band gap fluorescence properties in an aqueous solution, a method described in J. Am. Chem. Soc. 109:5649 (1987) is well-known. However, any method based on the method in question could not bring adequate fluorescence properties. As a result of studies carried out earnestly by the inventors, a method to obtain commercially adequate fluorescence properties could be developed, in which semiconductor nanoparticles synthesized by a size-selecting photoetching technique are treated in a refining process, the surface of the particles reformed by sodium hydroxide or an amine-ammonium compound, the energy level at the particle surface made inactive by arranging the electron donor groups at the surface in question, and the band gap fluorescence properties made effective (JP-A Nos. 51863/2004 and 243507/2004, etc.) According to this method, synthesis of semiconductor nanoparticles which have high luminescence properties was made possible by using a safe and simple technique in an aqueous solution. Moreover, by coating an organic material thereon, we succeeded in obtaining a semiconductor nanoparticle having excellent light durability in an organic solvent (JP-A No. 103746/2005, etc.). Moreover, it has also been suggested that it is possible to functionalize the surface depending on the kind of compound. However, since problems still remain on the side of the chemical durability against pH etc. in an aqueous solution, a further improvement in technology has been desired.

As a method for solving the above-mentioned problems, a method for coating by various compounds can be contemplated. For instance, a method described in J. Am. Chem. Soc. 115:8706 (1993) is known as a method for coating with TOPO. However, JP-A No. 523758/2001 points out that it cannot be used commercially.

A method described in J. Am. Chem. Soc. 125:320 (2003) is known as an example to coat using an amphiphilic polymer. However, it is not similar to a nanoparticle of the present invention because it uses a semiconductor nanoparticle having a core-shell type structure modified by a thiol compound, and the original purpose of coating using the amphiphilic polymer in question is not to maintain the fluorescence properties.

A method described in Science, 298, 1759, 29 Nov. 2002 is known as an example to coat using phospholipids. However, it is not similar to a nanoparticle of the present invention because it uses a semiconductor nanoparticle having a core-shell type structure, and the original purpose of coating using the phospholipids in question is not to maintain the fluorescence properties.

A method described in JP-A No. 525394/2002 is known as a method for coating using a surface-active agent. However, it is not similar to a nanoparticle of the present invention because it uses a semiconductor nanoparticle having a core-shell type structure, and the original purpose of coating using the surface-active agent in question is to dissolve it in water and not to maintain the fluorescence properties.

A method described in Chem. Lett. 33 840 (2004) is known as a method for coating using polyethylene glycol, but a thiol compound is used for a modulator, so that it is not similar to the present invention.

There are various reports and applications in addition to the above-mentioned examples (J. Phys. Chem. 100:8927 (1996) and J. Phys. Chem. 92:6320 (1988)), but they are not similar to the present invention from the point of having a core-shell type structure, etc. or they do not one have luminescence properties which can be used for commercial applications.

As a method for controlling the particle size which can be suitable for the present invention, a size selective photo-etching technique described in J. Phys. Chem. B. 105:6838 (2001), etc. can be enumerated. Here, a size selective photoetching technique will be described. Physicochemical properties of the semiconductor nanoparticle appear depending on the particle size due to the quantum size effect. Therefore, the properties are averaged in this state and it is not possible to adequately display the properties of the semiconductor nanoparticle. Therefore, it is necessary to carry out, using a chemical technique, a precise particle size separation of the semiconductor nanoparticles, which have a wide particle size distribution right after preparation, and to make a monodispersion by separating and extracting semiconductor nanoparticles having only a specified particle size. As a method to do the abovementioned operation, a size selective photoetching technique is enumerated. The size selective photoetching technique uses the fact that the energy gap of the semiconductor nanoparticle increases with decreasing particle size due to the quantum size effect and a metallic chalcogenide semiconductor is oxidized/dissolved by irradiating light under the presence of dissolved oxygen. It is a method for controlling the particle size to a smaller semiconductor nanoparticle by irradiating a monochromatic light, which has a shorter wavelength than the absorption edge thereof, to the semiconductor nanoparticles having a wide particle size distribution to make only semiconductor nanoparticle having large particle size photo-excite selectively and letting them dissolve. According to this method, in the case when light with a wavelength of 476.5 nm is irradiated, the particle size distribution of the semiconductor nanoparticle becomes an average particle size of 3.2 nm with a standard deviation of 0.19 nm. It exhibits a very narrow particle size distribution in which the standard deviation is about 6% of the average particle size. That is, an extremely monodisperse semiconductor nanoparticle solution can be obtained.

SUMMARY OF THE INVENTION

The inventors have been studying semiconductor nanoparticles having high luminescence properties. As a result, a semiconductor nanoparticle and a synthesis method thereof have been developed by adding a layer corresponding to an oxide layer or arranging electron donor groups on the surface as described in JP-A Nos. 51863/2004 and 243507/2004. However, it has become a subject that the aforementioned semiconductor nanoparticles are influenced by a chemical effect such as pH, etc. Then, the inventors developed a semiconducting nanoparticle and a synthesis method thereof as described in JP-A No. 103746/2005, in which the surface of the particle is coated by an amine-ammonium compound to add durability, and it is perfectly dispersed in an organic solvent. However, in order to apply the aforementioned semiconductor nanoparticle to wide usage in the fields related to biotechnology, etc., it becomes necessary to add the chemical durability against pH etc. in an aqueous solution. It is an objective of the present invention to provide a solution for the problem of chemical durability in an aqueous solution of a semiconductor nanoparticle described in JP-A Nos. 51863/2004, 243507/2004 and 103746/2005.

That is, firstly, the present invention is an invention of a semiconductor nanoparticle having excellent luminescence properties, in which electron donor groups are arranged at the outside of the semiconductor nanoparticle core, and moreover, organic compounds such as an amphipathic compound, etc. are arranged outside thereof, which has a combination of two parts or more selected from a first polar group, a hydrophobic group, a second polar group, a hydrophilic group, and a functional group having bondability with a biopolymer, in order, from the inside (herein, the hydrophobic group is a necessary element and the hydrophilic part and the functional part may be combined). A semiconductor nanoparticle of the present invention has high luminescence properties and excellent chemical stability.

Each boundary of the first polar group, the hydrophobic group, the polar group, the hydrophilic group, and the functional group having bondability with a biopolymer of the aforementioned surface-active agent, the amphipathic compound, or the lipids may be bound through a linker part as one desires. Here, the linker may be identical with the hydrophobic group or the hydrophilicgroup.

FIG. 1 is a schematic drawing illustrating an example of a semiconductor nanoparticle of the present invention having high luminescence properties. As shown in FIG. 1, a semiconductor nanoparticle of the present invention is characterized by providing a layer 2 including electron donor groups on the surface of the semiconductor nanoparticle core 1, and outside thereof, layers of a first polar group, a hydrophobic group, a second polar group, a hydrophilic group, and a functional group 5 having bondability with a biopolymer, or layers constituting a combination of any of the above-mentioned groups are provided. In the present invention, as a method for adding chemical durability to the aforementioned semiconductor nanoparticle, the surface of the semiconductor nanoparticle 1 coated by the layer 2 including electron donor groups described in the above-mentioned JP-A Nos. 51863/2004 and 243507/2004 was coated by the hydrophilic group 4 through the hydrophobic group 3 to control the effect of external factors on the particle surface, resulting in chemical durability being added. Concretely, this was performed by coating a surface-active agent, an amphiphilic molecule, and a lipid, etc. on the surface of the semiconductor nanoparticle which is prepared by a method described in the above mentioned JP-A No. 103746/2005 and completely dispersed in an organic solvent.

The surface-active agent, the amphiphilic molecule, and the lipid used here are thought to be ones composed principally like those in FIGS. 2 and 3, for the most part. In FIGS. 2 and 3, the hydrophobic group 3 is composed of the hydrophobic group 11; the hydrophilic group 4 is composed of the hydrophilic group 14; and the functional group 5 having bondability with a biopolymer is composed of a carboxyl group and an amide group 13. Moreover, the first and second polar groups 6 and 7 are composed of polar groups 12 and 15.

As shown in FIG. 2, in the case when the hydrophobic group 3 is included at the end, it is arranged with the layer including the electron donor group of the semiconductor nanoparticle through the hydrophobic group 3 in question. As shown in FIG. 3, in the case when the polar group 15 such as an amino group is included at the end, it is arranged with the layer including the electron donor group of the semiconductor nanoparticle through the polar group 15 in question.

At least one selected from a group of —OR, —OCH$_2$R, —OCOCH$_2$R, —NHR, —N(CH$_2$R)$_2$, —NHCOCH$_2$R, —CH$_2$R, —C$_6$H$_4$R, and —P(CH$_2$R)$_3$ is preferable for the electron donor group (herein, R is selected from hydrogen and a substituted or a non-substituted hydrocarbon group). Specifically, a hydroxyl group is preferable for the electron donor group. Moreover, these layers including an electron donor group may not only be single-layer, but also multiple-layer.

In the case of one in which the first polar group, the hydrophobic group, the second polar group, the hydrophilic group, the functional group, and the linker include a part bonding each other by a polymerization or condensation reaction, the durability of the semiconductor nanoparticle is improved by bonding the organic compounds to each other, so that it is more preferable.

In the present invention, there is no specific limitation for the material of the semiconductor nanoparticle. Concretely, one or more selected from a group of ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, TiO$_2$, WO$_3$, PbS, PbSe, MgTe, AlAs, AlP, AlSb, AlS, Ge, and Si is preferably illustrated.

It is preferable that the semiconductor nanoparticle of the present invention having excellent durability be a monodisperse particle size, and the particle size have a deviation in diameter of preferably less than 10% rms.

Moreover, the semiconductor nanoparticle of the present invention having excellent durability has excellent luminescence properties, and in particular, fluorescence properties; light having a narrow spectral range of 40 nm or less of full width at half maximum (FWHM) is emitted when excitation light is irradiated.

Secondly, the present invention is an invention of a manufacturing method of the above-mentioned semiconductor nanoparticle having high luminescence properties and excellent chemical stability, and it includes a process for arranging electron donor groups on the surface of a semiconductor nanoparticle by adding a surface treatment material which gives one or more electron donor groups to the semiconductor nanoparticle and a process for arranging a surface-active agent, an amphipathic compound, and a lipid which have a combination of two layers or more selected from a first polargroup, a hydrophobic group, a second polar group, a hydrophilic group, and a functional group having bondability with a biopolymer, in order (herein, the hydrophobic group is a necessary element and the hydrophilic group and the functional group may be combined).

In the present invention, it is preferable that the process for arranging the electron donor groups on the surface of the semiconductor nanoparticle be performed under an alkaline environment. Specifically, it is preferable that the semiconductor nanoparticle be reacted with an active hydrogen-containing compound under an alkaline environment. More concretely, in the case when CdS is used, an alkaline environment of pH 9 to 11 is preferable.

Thirdly, the present invention is a fluorescent reagent which is composed of the above-mentioned semiconductor nanoparticles having high luminescence properties and excellent chemical stability.

Fourthly, the present invention is an optical device which is composed of the above-mentioned semiconductor nanoparticles having high luminescence properties and excellent chemical stability.

Fifthly, the present invention is an inorganic material, an organic material, and an inorganic/organic composite material which include the above-mentioned semiconductor nanoparticles having high luminescence properties and excellent chemical stability.

According to the present invention, the semiconductor nanoparticle coated by a specific organic material can show high luminescence properties. These can give chemical durability by coating a specific organic material onto the aforementioned semiconductor nanoparticles.

DETAILED DESCRIPTION OF THE PREFERRED EMBODIMENT

Figure 1:
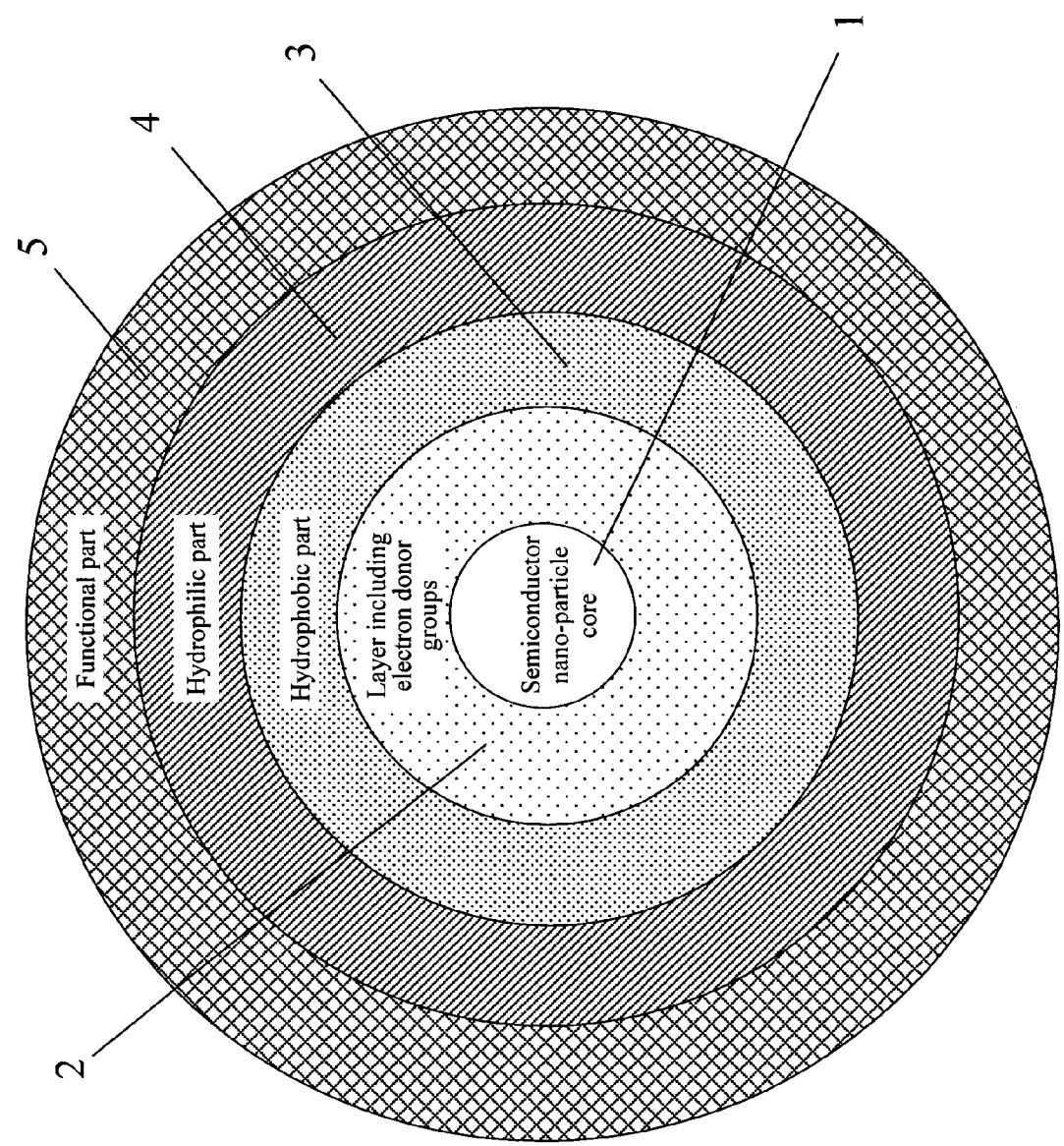
FIG. 1 is a schematic drawing illustrating an example of a preferable structure of a nanoparticle prepared by the present invention.

The preferred embodiments of the present invention will be described as follows. Preparation of the semiconductor nanoparticle is carried out by a method using a Buffer based on a method of JP-A No. 352594/2004. The semiconductor nanoparticle has an extremely high surface area to volume ratio and it is in a condition where it can be flocculated very easily. Therefore, in order to let the semiconductor nanoparticle exist stably, measures to prevent the particles from colliding and coalescing with each other is needed. Various methods have been proposed in the past. If they are broadly divided, one is a physical isolation of the semiconductor nanoparticles by incorporation in a solid state matrix and a polymer matrix, and another is making the surface of the particles inactive by chemically modifying the metallic ion sites at the surface of the particles by using a low molecular weight organic material which has high complex formation ability with them. In this method, hexametaphosphoric acid is used for a stabilizer based on the latter consideration.

[Method of Preparing Semiconductor Nanoparticles]

In the Case of Using a Size Selective Photoetching Technique

First of all, 61.8 mg of sodium hexametaphosphate (0.1 mmol) and 84.4 mg of cadmium perchlorate (0.2 mmol) were added in a container filled with 1000 ml of 30° C. ultrapure water, 141.960 mg of disodium hydrogenphosphate (1 mmol) was added, and then this solution was stirred for 30 minutes in a container which was sealed up while bubbling nitrogen. After that, 4.96 cm$^{-3}$ (1 atm, 25° C.) of hydrogen sulfide gas was added to the aforementioned container while shaking strongly to make S$^{2-}$ and Cd$^{2+}$ equal, and it was agitated for several hours at room temperature. At this time, the color of the solution changed from optically clear colorless to optically clear yellow. Moreover, after removing unreacted hydrogen sulfide in the solution by bubbling nitrogen into the solution, oxygen bubbling was carried out for ten minutes and 25.7 mg of methyl viologen (0.1 mmol) was added. Here, monochromatic light using a laser, etc. or light from a mercury vapor lamp through a filter was irradiated onto the aforementioned solution to control the particle size using a size selecting photoetching technique. Then, after the aforementioned solution was agitated for 30 minutes while bubbling, 50 μl of 3-mercaptopropionic acid was added and agitated for one night under shading.

In the Case of not Using a Size Selective Photoetching Technique

First of all, 61.8 mg of sodium hexametaphosphate (0.1 mmol) and 84.4 mg of cadmium perchlorate (0.2 mmol) were added in a container filled with 1000 ml of 30° C. ultrapure water, 28.392 mg of disodium hydrogenphosphate (0.2 mmol) and 95.984 mg of sodium dihydrogenphosphate (0.8 mmol) were added, and then this solution was stirred for 30 minutes in a container which was sealed up while bubbling nitrogen. After that, 4.96 cm$^{-3}$ (1 atm, 25° C.) of hydrogen sulfide gas was added to the aforementioned container while shaking strongly to make S$^{2-}$ and Cd$^{2+}$ equal, and it was agitated for several hours at room temperature. Moreover, after removing unreacted hydrogen sulfide in the solution by bubbling nitrogen into the solution, 50 μl of 3-mercaptopropionic acid was added and agitated for one night under shading.

[Surface Modification of Particles]

Surface modification of particles was performed based on a method described in the above mentioned JP-A Nos. 51863/2004 and 243507/2004. 1000 ml of solution prepared by either way mentioned above was ultra-filtered and concentrated to several milliliters to remove methyl viologen, hexametaphosphoric acid, unreacted thiol compound, and ions etc. dissolved while photoetching, and it was made into a surface modified semiconductor nanoparticle solution by a pure thiol compound. Afterwards, it was ultra-filtered by adding pure water and refined by repeating this several times. Afterwards, surface modification was performed by using a solution which was finally concentrated to several milliliters.

Figure 4:
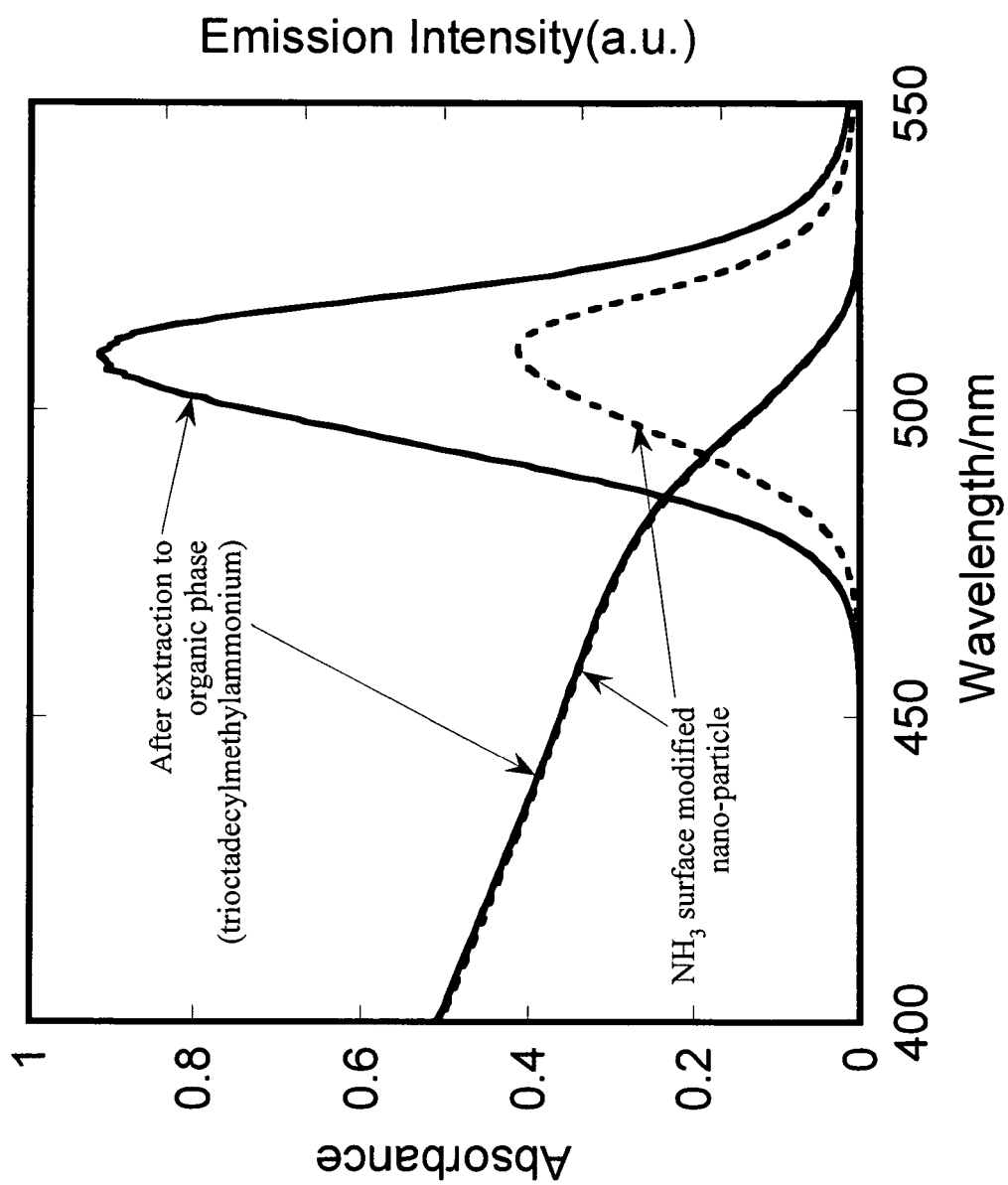
FIG. 4 shows optical spectra of a semiconductor nanoparticle having high luminescence properties on which electron donor groups before/after extraction to an organic solvent.

The refined thiol-modified nanoparticle solution obtained as above was diluted by using 0.1M NaOH—HCl pH 11 aq. or 0.1M NH$_3$ aq. to make the absorbance be 0.5, and the surface treatment was carried out by keeping it for several days under irradiating fluorescent light, resulting in a semiconductor nanoparticle solution having high luminescence properties being obtained. The solution obtained was optically clear yellow and it had excellent luminescence properties. Optical spectra at this time are shown in FIG. 4.

[Coating of Particles]

Surface coating of particles was performed according to the above mentioned JP-A No. 103746/2005. Either one in which a mixed solution made by adding tridodecylmethylammonium chloride to an organic solvent such as hexane or toluene to be 1 mg/ml against the solvent was added to the aforementioned surface modified semiconductor nanoparticle solution to be ⅒ amount of the solution, or one in which a mixed solution made by adding trioctadecylmethylammonium bromide to an organic solvent to be 2 mg/ml was added to the solution to be ⅒ amount of the solution and the same amount of methanol as the solution was added, was strongly agitated for a while. As a result, it could be seen that the optically clear yellow part was transferred from the aqueous phase to the organic phase. Then, after performing a centrifugal separation, the aqueous phase and the organic phase were separated. The aforementioned recovered organic phase was diluted by adding hexane and toluene, etc. to be the same absorbance as the aforementioned aqueous solution before transfer. The semiconductor nanoparticles transferred to the organic phase still maintain high luminescence properties. In the present invention, an example using trioctadecylmethylammonium is actively illustrated, and the optical spectra are shown in FIG. 4.

Figure 2:
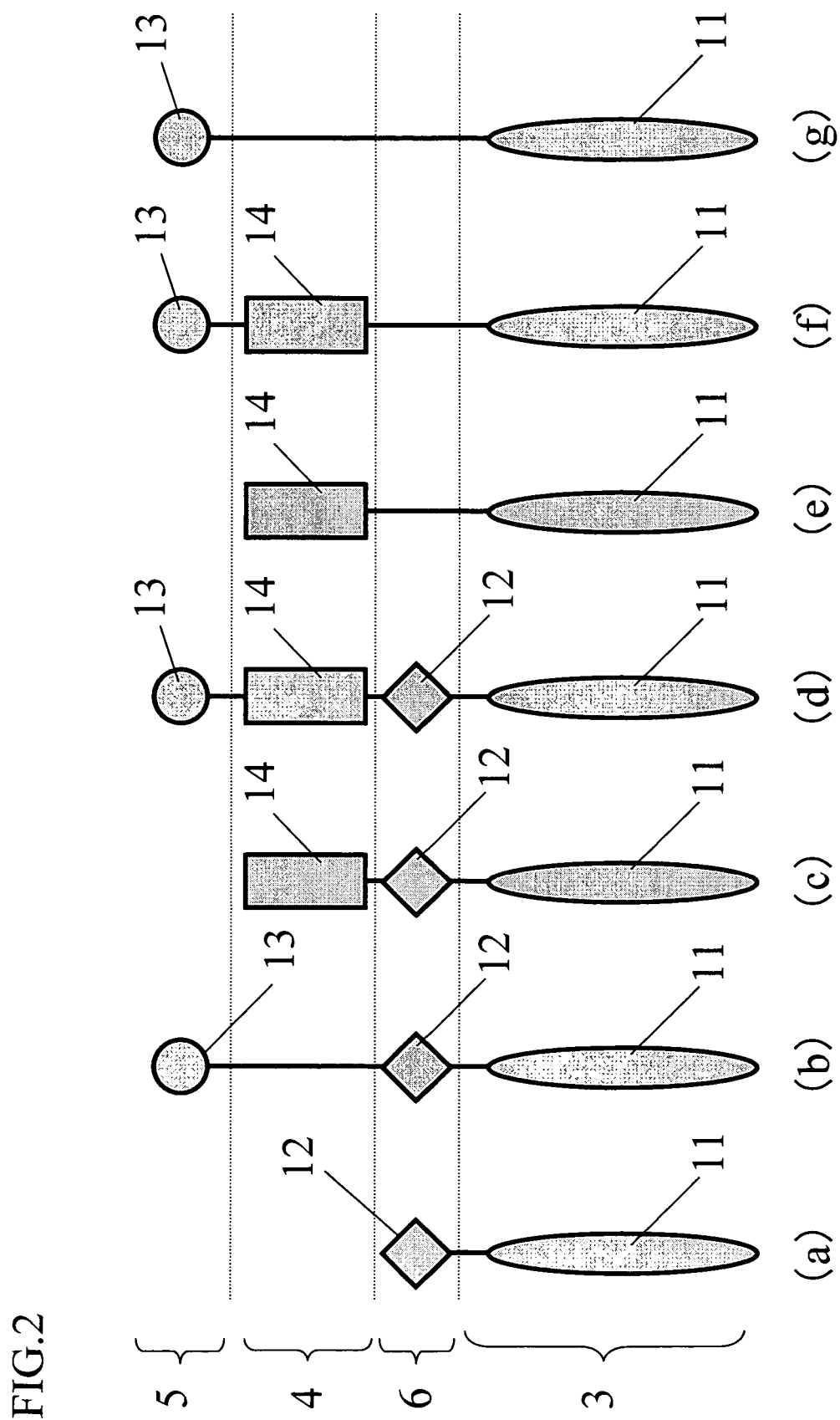
FIG. 2 a schematic drawing illustrating surface-active agents and amphipathic molecules used for the present invention.
Figure 3:
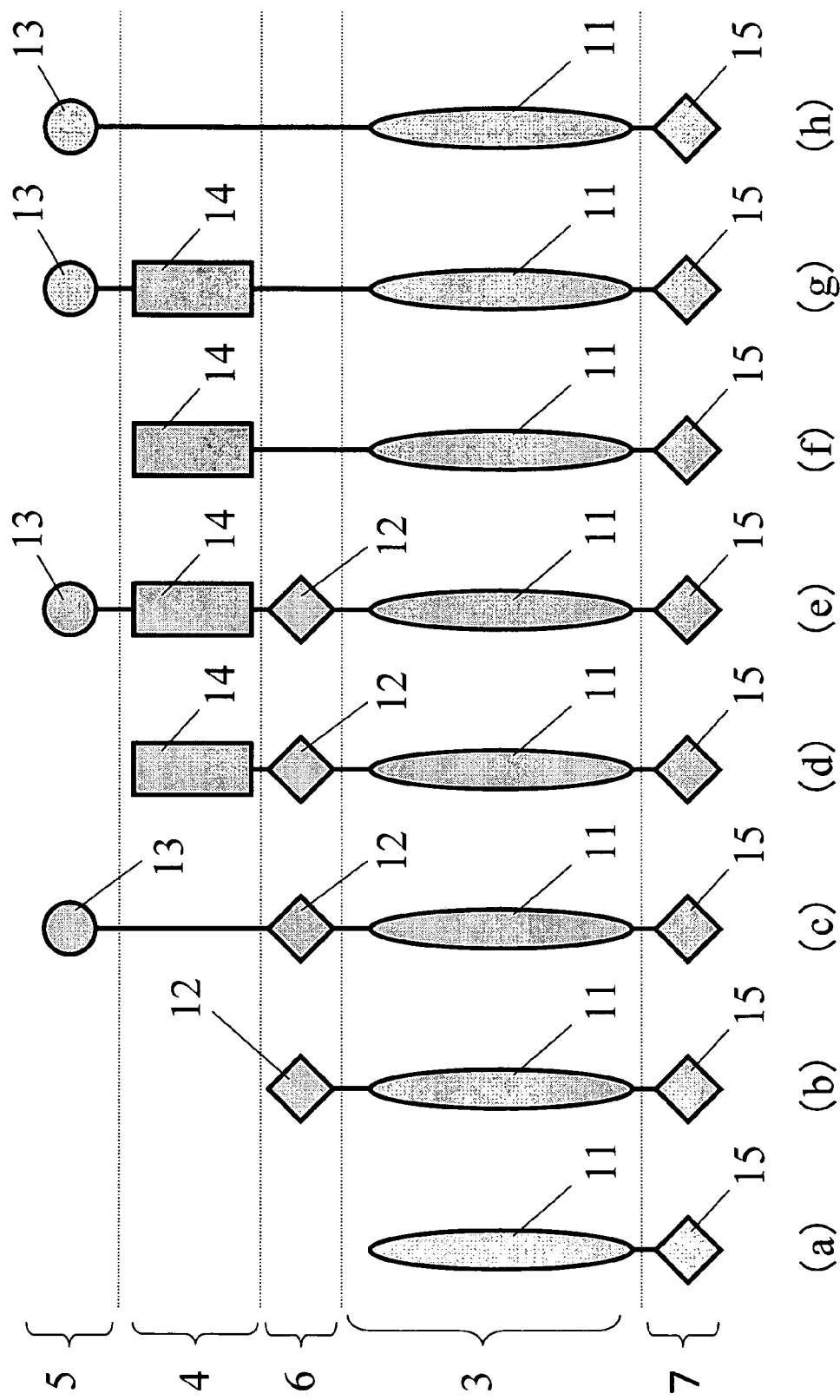
FIG. 3 a schematic drawing illustrating other surface-active agents and amphipathic molecules used for the present invention.

By using amphipathic compounds, coatings were laminated onto nanoparticles perfectly dispersed into an organic solvent obtained as mentioned above. As amphipathic compounds used here, there are illustrations that dodecyltrimethylammonium is for cation surface-active agents (examples for FIG. 2(a) and FIG. 3(a)), sodium dodecyl sulfate for anion surface-active agents (example for FIG. 2(a)), lauryl dimethylaminoacetic acid for ampholytic surface active agents (example for FIG. 2(b)), and tetraethylene glycol dodecyl ether for nonionic surface active agents (example for FIG. 2(e)).

First, the case of using dodecyltrimethylammonium will be illustrated. 10 ml of solution in which nanoparticles were perfectly dispersed into the aforementioned organic solvent was put into a container such as a stoppered test tube and eggplant shaped flask, etc. and made into a film shape on the wall of the container by evaporation. Then, the particles were dissolved again by adding 2 ml of solution in which dodecyltrimethylammonium chloride was dissolved into chloroform to be 5 mM, and made into a film shape again on the wall of the container by evaporation. Moreover, removing residual chloroform by heating at 90° C., the particles were dissolved again by adding 2 ml of methanol. Then, methanol was removed by adding 10 ml of ultra pure water and heating it to 90° C. Finally, an optically clear yellow solution could be obtained by performing centrifugal separation to remove the precipitation.

Next, the cases of using sodium dodecyl sulfate, lauryl dimethylaminoacetic acid, tetraethylene glycol dodecyl ether will be illustrated. 10 ml of solution in which nanoparticles were perfectly dispersed into an organic solvent was put into a container such as a stoppered test tube and eggplant shaped flask, etc. and made into a film shape on the wall of the container by evaporation. Then, adding an aqueous solution in which the aforementioned surface-active agent was to be a concentration of 1 mM, it was agitated at room temperature. At this time, an ultrasonic cleaner may be used and heating it up does not cause any problem.

Figure 5:
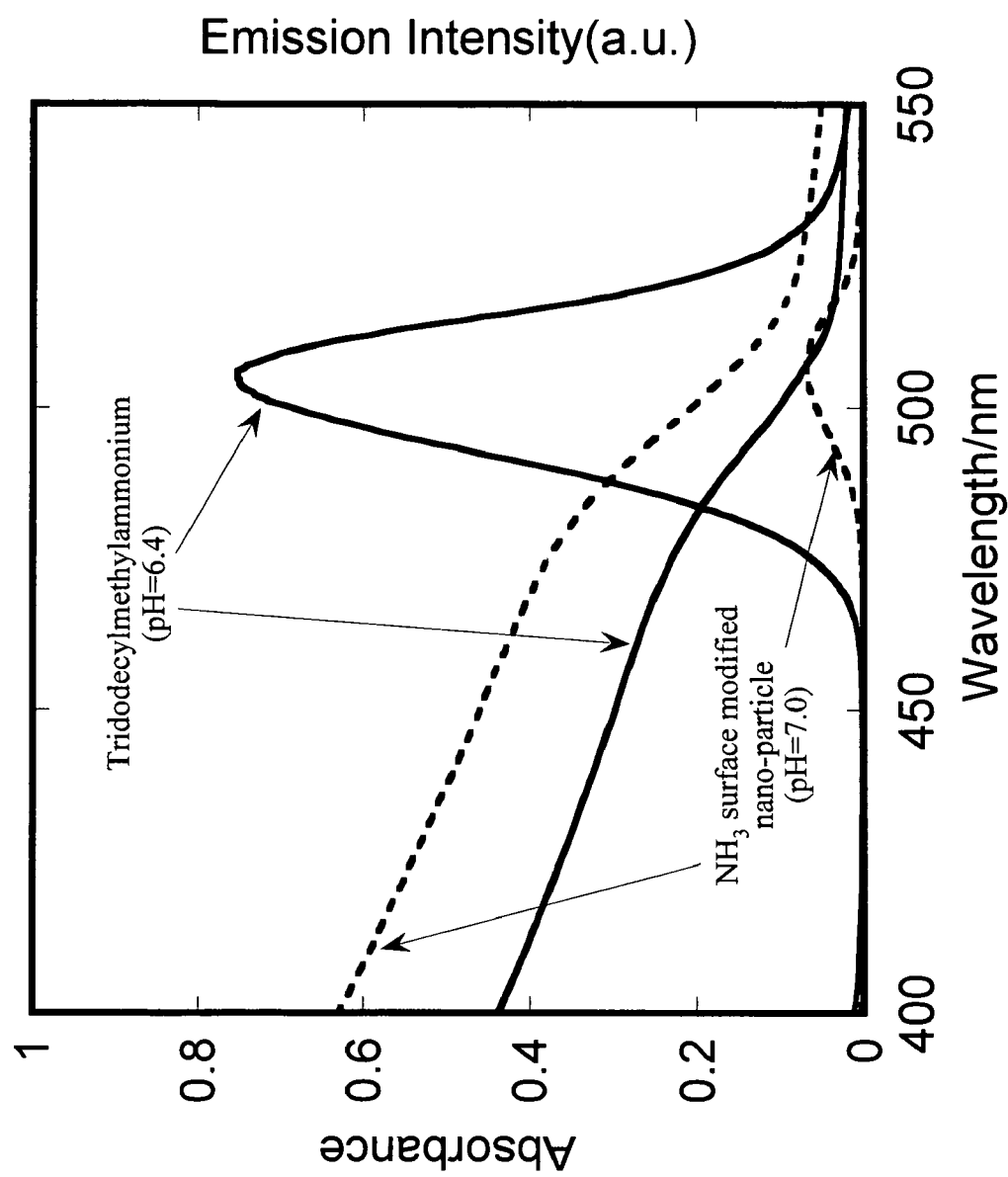
FIG. 5 shows optical spectra comparing durability in a neutral region in the case of using dodecyltrimethylammonium.
Figure 6:
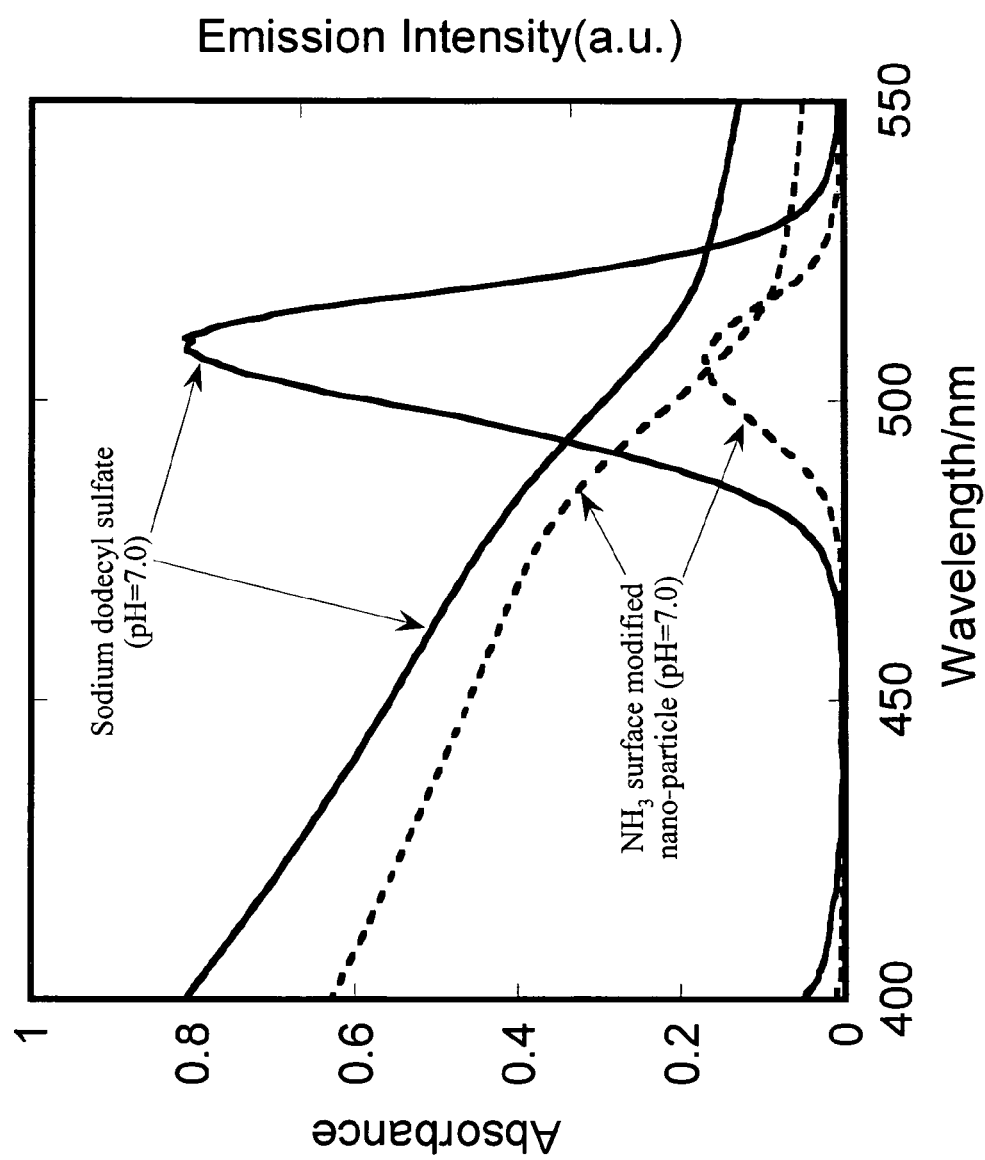
FIG. 6 shows optical spectra comparing durability in a neutral region in the case of using sodium dodecyl sulfate.
Figure 7:
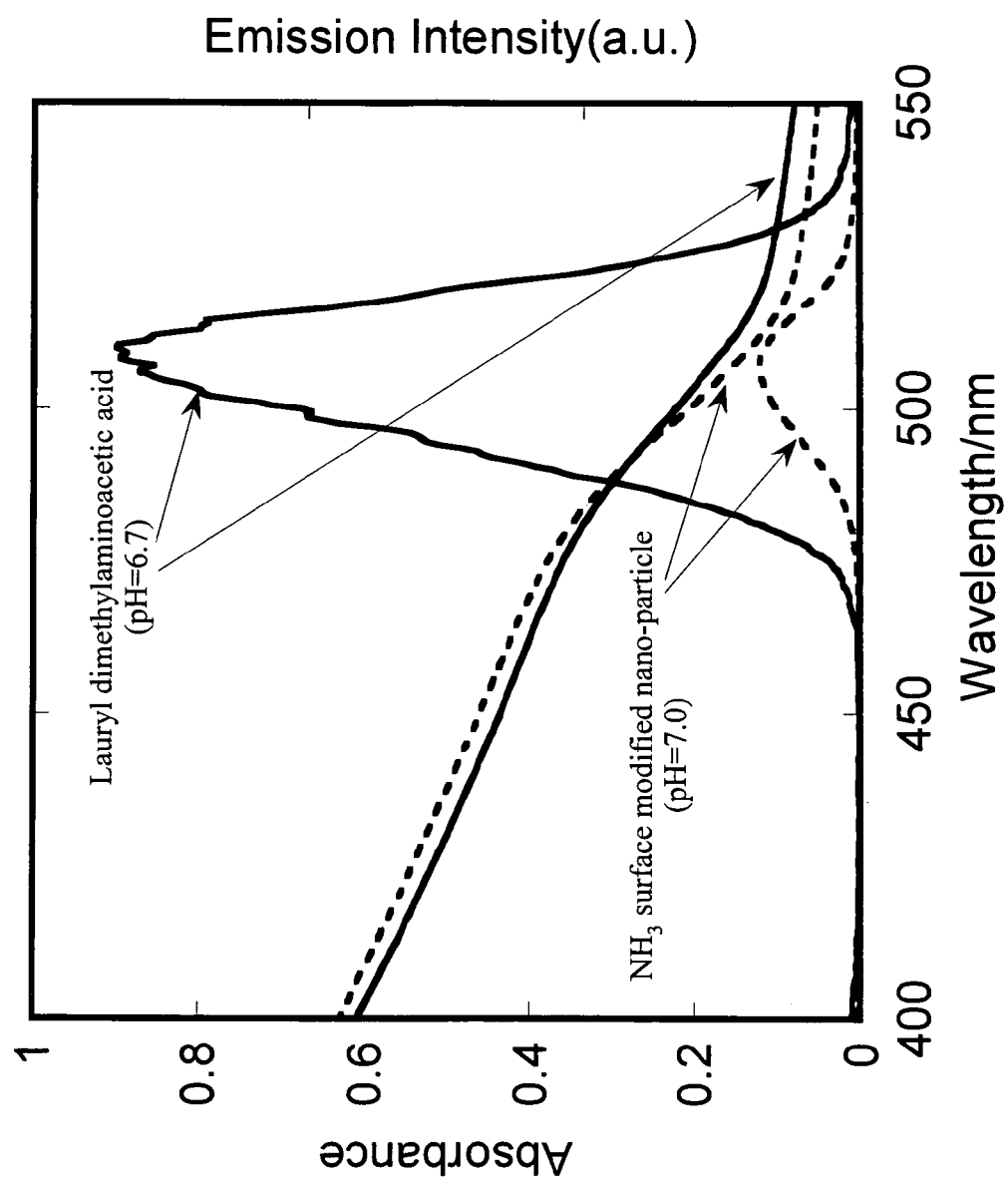
FIG. 7 shows optical spectra comparing durability in a neutral region in the case of using lauryl dimethylaminoacetic acid.
Figure 8:
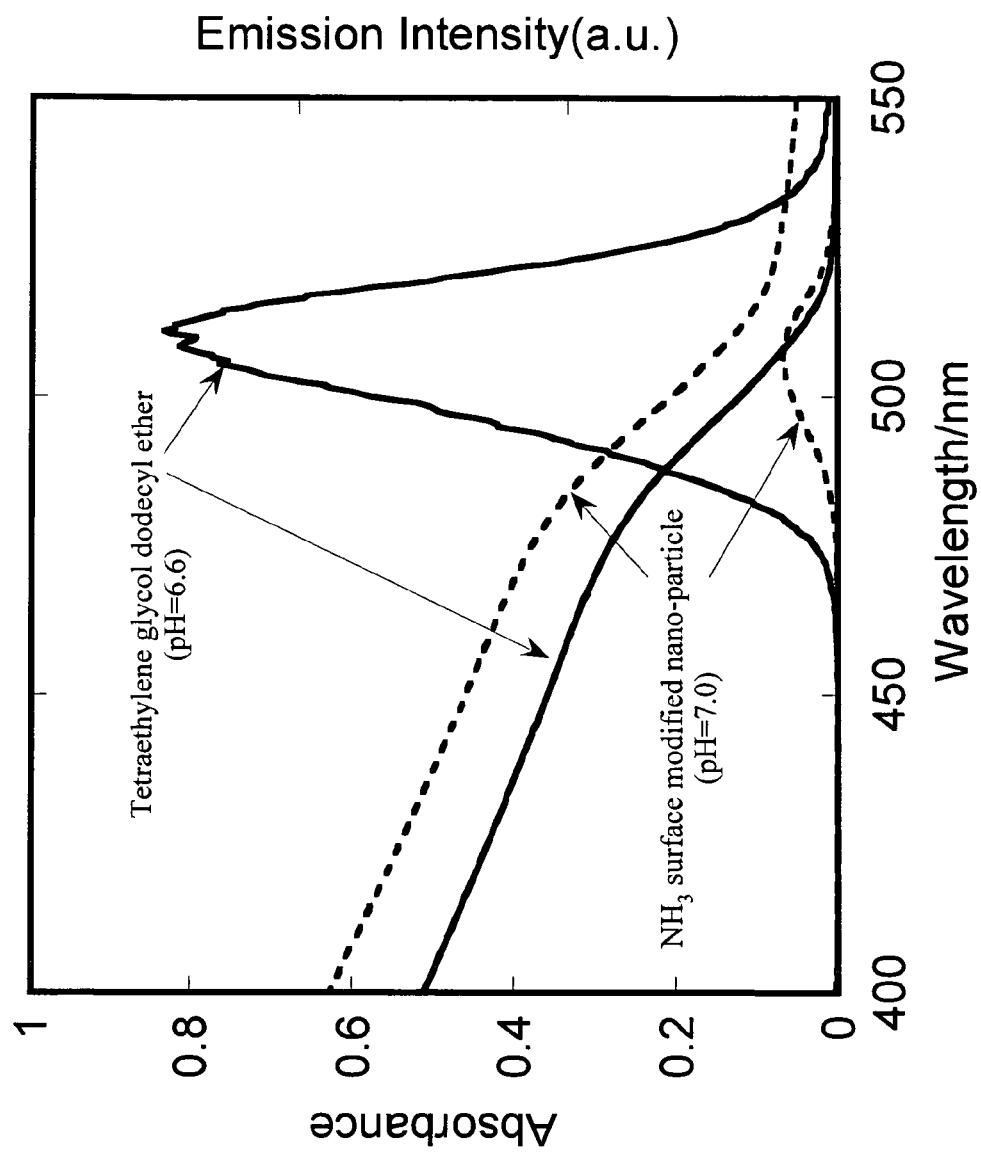
FIG. 8 shows optical spectra comparing durability in a neutral region in the case of using tetraethylene glycol dodecyl ether.

In either of the cases mentioned above, nanoparticles dissolved in an aqueous solution can be obtained after agitation and ultrasonic treatment. At this time, the pH value depends on the kind of surface-active agent. After that, the pH value was changed to a neutral region by using hydrochloric acid. In this embodiment, in order to show the durability, it is compared with one in which the nanoparticles whose surface was modified by ammonia aqueous solution was made neutral by adding hydrochloric acid. FIGS. 5 to 8 are optical spectra at that time. FIG. 5 shows one using dodecyltrimethylammonium (first embodiment), FIG. 6 one using sodium dodecyl sulfate (second embodiment), FIG. 7 one using lauryl dimethylaminoacetic acid (third embodiment), and FIG. 8 one using tetraethylene glycol dodecyl ether (fourth embodiment). Here, it is understood that the semiconductor nanoparticles synthesized by this method shows the fluorescence properties sufficiently even in the neutral region compared with the semiconductor nanoparticles on which only a surface modification was applied. Moreover, by combining a particle size control method such as a size selecting photoetching technique, this method makes it possible to synthesize a semiconductor nanoparticle having high luminescence properties of various fluorescent colors.

Figure 9:
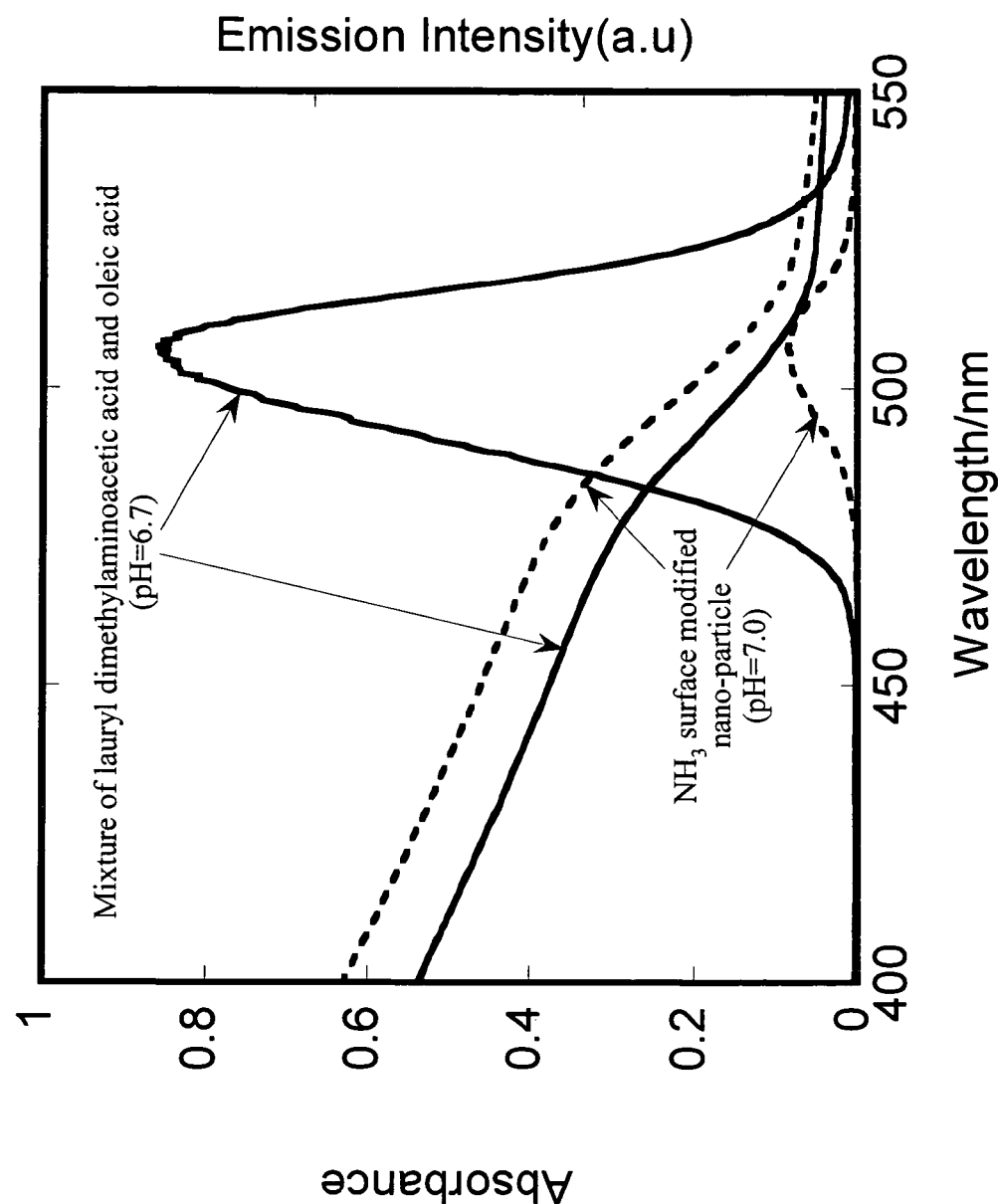
FIG. 9 shows optical spectra comparing durability in a neutral region in the case of using a mixture of lauryl dimethylaminoacetic acid and oleic acid.

According to the kind of surface-active agent used, for instance, it is also possible to make the composition of the surface-active agent to be a mixture using the protocol similar to that mentioned above. Here, the case of mixing lauryl dimethylaminoacetic acid and oleic acid to be 1:9 is illustrated, and the optical spectra at this time are shown in FIG. 9 (fifth embodiment).

In the present invention, surface-active agents were actively illustrated, but it is possible to achieve similar effects even with various organic compounds such as an amphipathic molecule and a lipid, etc. including other surface-active agents. Moreover, it becomes possible to design the structure of the inside and surface freely according to the kind of materials used. Furthermore, any of the first or second polargroups, the hydrophobic group, the hydrophilic group, the functional group, and the linker is formed by a polymerization or condensation reaction. That is, it is possible to make it a stronger configuration by binding the compounds comprising the coating part to each other according to a polymerization or a condensation reaction. Moreover, in the case of using a polymer in which various monomers are polymerized, similar effects to the present invention can be achieved.

According to the present invention, it becomes possible to synthesize easily a semiconductor nanoparticle which has high luminescence properties and excellent chemical stability. The semiconductor nanoparticle of the present invention can be used for a fluorescent reagent and an optical device, etc. by using the high luminescence properties.

What is claimed is:

1. A semiconductor nanoparticle having luminescence properties comprising:
   a semiconductor nanoparticle core on and outside of which an electron donor group is arranged and, at the outside thereof, a combination of two or more layers composed of a first polar group, a hydrophobic group, a second polar group, a hydrophilic group, and a functional group having bondability with a biopolymer, are arranged, in order from inside, wherein the hydrophobic group is a necessary element, and the hydrophilic group and the functional group are optional.

2. A semiconductor nanoparticle according to claim 1, wherein
   each boundary among the first polar group, the hydrophobic group, the second polar group, the hydrophilic group and the functional group is bound through a linker.

3. A semiconductor nanoparticle according to claim 2, wherein
   the first polar group, the hydrophobic group, the second polar group, the hydrophilic group, the functional group, and the linker include a group which is bonded to each other by a polymerization or condensation reaction.

4. A semiconductor nanoparticle according to claim 1, wherein
   said electron donor group comprises at least one selected from the group consisting of —OR, —OCH$_2$R, —OCOCH$_2$R, —NHR, —N(CH$_2$R)$_2$, —NHCOCH$_2$R, —CH$_2$R, C$_6$H$_4$R, —P(CH$_2$R)$_3$, wherein R is selected from hydrogen and a substituted or a non-substituted hydrocarbon group.

5. A semiconductor nanoparticle according to claim 1, wherein
   said electron donor group is a hydroxyl group.

6. A semiconductor nanoparticle according to claim 1, wherein
   a layer including said electron donor group includes one layer or more.

7. A semiconductor nanoparticle according to claim 1, wherein
   the material of said semiconductor nanoparticle is at least one selected from the group consisting of ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, TiO$_2$, WO$_3$, PbS, PbSe, MgTe, AlAs, AlP, AlSb, AlS, Ge, and Si, which is made into a core-shell structure.

8. A semiconductor nanoparticle according to claim 1, wherein
   the particle size of said semiconductor nanoparticle is a monodispersion which has a deviation in diameter of less than 10% rms.

9. A semiconductor nanoparticle according to claim 1, wherein
   light having a narrow spectral range of 40 nm or less of full width at half maximum (FWHM) is emitted, when excitation light is irradiated onto said semiconductor nanoparticle.

10. A fluorescent reagent comprising:
    a semiconductor nanoparticle according to claim 1.

11. An optical device comprising:
    a semiconductor nanoparticle according to claim 1.

12. An inorganic material, an organic material, or organic/inorganic composite material comprising:
    a semiconductor nanoparticle according to claim 1.

13. A method of manufacturing a semiconductor nanoparticle comprising:
    providing a semiconductor nanoparticle core;
    providing electron donor groups on the surface of the semiconductor nanoparticle core by adding a surface treatment material which gives one or more electron donor groups thereonto and
    providing one or more layers of organic compounds which have a combination of two or more layers composed of a first polar group, a hydrophobic group, a second polar group, a hydrophilic group, and a functional group having bondability with a biopolymer, in order from inside, wherein the hydrophobic group is a necessary element, and the hydrophilic group and the functional group are optional.

* * * * *